United States Patent [19]

Shay et al.

[11] 3,904,623

[45] Sept. 9, 1975

[54] PHENOL-TRIAZINE ADDITION PRODUCTS

[75] Inventors: Greg D. Shay, Country Club Hills; James H. Griffith, Homewood, both of Ill.

[73] Assignee: The Sherwin-Williams Company, Cleveland, Ohio

[22] Filed: Dec. 26, 1973

[21] Appl. No.: 427,604

[52] U.S. Cl. .......................... 260/249.6; 260/75 T
[51] Int. Cl.² ........................................ C07D 251/70
[58] Field of Search .................................. 260/249.6

[56] References Cited
UNITED STATES PATENTS 3,806,480   4/1974   Leonard.................... 260/249.6 X Primary Examiner—John M. Ford
Attorney, Agent, or Firm—James V. Tura; Richard G. Smith

[57] ABSTRACT

This invention is directed to low molecular weight, solid addition products having a softening point above 100°F and the method of preparing same and more particularly to the use of said addition products as crosslinking agents in various polymeric powder coatings, e.g polyesters. The solid, low molecular weight products are derived from the addition reaction of at least one monohydroxy, single-ring aromatic carbon compound and hexakis (alkoxymethyl) aminotriazine.

12 Claims, No Drawings

PHENOL-TRIAZINE ADDITION PRODUCTS

This invention relates to low molecular weight, non-gelled, solid addition-products having softening points above about 100°F and to the method of preparing same and more particularly, to the use of the solid addition products as crosslinking agents for polymeric powders comprising various polymers having some unreacted or free carboxyl, anhydride, hydroxyl, epoxy or amide functional groups, e.g. polyesters, polyepoxides, polyacrylates, cellulosics, polyurethanes and the like. The addition products of this invention are particularly characterized as being low molecular weight, solid compounds obtained by the addition reaction of at least one monohydroxy single-ring aromatic carbon compound and alkoxymethyl amino-triazines. By using effective amounts of the solid addition products in combination with polymers containing carboxyl, anhydride, hydroxyl, epoxy or amide functionalities curable homogeneous coating compositions may be obtained which are particularly useful for the preparation of powder coatings. These curable polymeric coating compositions are capable of being sprayed, as a dry powder, on various substrates including wood, metal, textiles, glass, plastics, etc. and subsequently cured at temperatures ranging up to about 500°F.

There is growing concern about the environment which has necessitated the development of pollution-free, nonsolvent-containing coatings throughout the coating industry. One of the first of such coatings is the completely nonsolvent system sometimes referred to as dry paint and better known as spray or powder coatings. These coatings not only reduce or eliminate the emission of solvent, but also avoid fires and waste disposal problems in addition to having the advantage of improved performance, low cost and an overall technological advantage.

Generally, coatings take the form of organic solutions of various resins wherein the solvent acts as the carrier which is subsequently evaporated leaving a resin film. As indicated, however, the use of solvents has many disadvantages in that they are flammable, explosive, physiologically unacceptable, i.e. due to toxicity and generally are unsatisfactory. In some instances, the solvents have been replaced in part or whole by water which avoids many of the problems. Water, however, limits the type of synthetic resins that may be used and, therefore, affects the physical and chemical characteristics of the film ultimately obtained, e.g. low gloss, etc. Thus, due to the disadvantages inherent in the use of both water and organic solvents and particularly because of the growing ecological concern, there recently has been developed pollution-free, nonsolvent-containing coatings which are generally referred to as powder coatings. Powder coatings, as distinguished from coatings containing solvents, not only reduce or totally eliminate solvent emission and, therefore, avoid the environmental problem, but also avoid many other problems and still improve on the overall cost.

More specifically, various thermosetting and thermoplastic films are being applied by the powder coating method with the epoxy and polyester films being most prevelant. The polyester coatings, however, have been lagging in their general use primarily because of the difficulty encountered in obtaining satisfactory crosslinking agents. It is essential in forming films of polyesters, for example, that the crosslinking agent not only be economical, but also have a good cure response, a melting point either sufficiently high to avoid caking with the polyester in which they are powder blended or hot-melt blended and have little or substantially no volatile material. While many amino compounds have been used as crosslinking agents, not all of them have been completely satisfactory, particularly in terms of being economical and having a good cure response. In many instances, for example, the amino compounds emitted appreciable amounts of volatile material during the curing process.

Of the many different amino compounds used as crosslinking agents, of particular interest is hexakis (methoxymethyl) aminotriazine or hexakis (methoxymethyl) melamine commonly and hereafter referred to as HMMM, which is available commercially for both water and solvent-containing coatings. Some of the advantages in using HMMM in comparison to the more conventional amino resins are that HMMM is commercially available at a near 100 percent non-volatile content, is highly stable and has an indefinite shelflife in the absence of the catalyst. The stability of HMMM is due primarily to the fact that it has no active hydrogens and, therefore, will not self-condense. Moreover, HMMM is hexafunctional and thus has a high crosslinking potential. In the presence of an effective amount of an acid catalyst, however, hexakis (methoxymethyl) melamine is very reactive and can be used to crosslink a variety of polymeric materials containing, for example, carboxyl, hydroxyl or amide functionalities. The crosslinking reaction involves the methoxymethyl group (—CH$_2$—O—CH$_3$) of the aminotriazine which may be characterized by equations A, B and C.

(A) 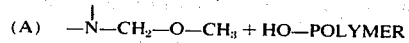

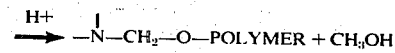

(B) 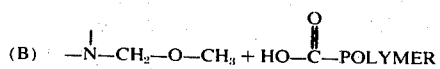

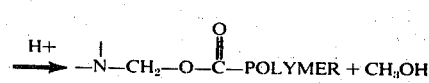

(C) 

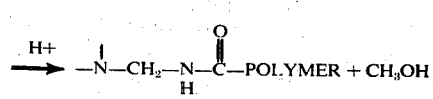

While hexakis (methoxymethyl) melamine is superior in many respects to some of the other amino compounds, as a crosslinking agent, the use of HMMM in powder coatings has not been completely acceptable because of its low melting and glass transition points and its tendency to cake after it has been hot blended with the polymers. These disadvantages are particularly pronounced when liquid species of HMMM are employed. In some instances there is an excessive amount of gassing in the film during the curing stage, due to the liberation of alcohol, which affects the quality of the film.

Thus, to avoid these and other problems and to provide improved crosslinking agents particularly corsslinking agents that can be used with polymers containing carboxyl, anhydride, epoxy, hydroxyl or amide functional groups, it has been found that solid addition products can be prepared by reacting a monohydroxy singlering aromatic compound with an alkoxymethyl amino-triazine. These solid products or crosslinking agents avoid many of the problems encountered in using some of the other amino compounds, but at the same time retain the outstanding characteristics recognized in the use of HMMM.

More specifically, an unique solid at ambient temperatures, non-gelled, low molecular weight addition reaction product having a softening point above about 100°F can be obtained by reacting a. approximately 1.8 to 2.2 and preferably about 2.0 moles of at least one monohydroxy single-ring aromatic compound having the formula:

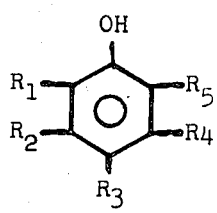

wherein the R substituents $R_1$, $R_2$, $R_3$, $R_4$ and $R_5$ are either the same or different and are selected from the class consisting of hydrogen, alkyl radicals of 1 to 4 carbon atoms, alkoxy radicals of 1 to 4 carbon atoms and $NO_2$ radicals provided that at least one of the R substituents is hydrogen and b. approximately 1.0 mole of an alkoxymethyl aminotriazine having the formula:

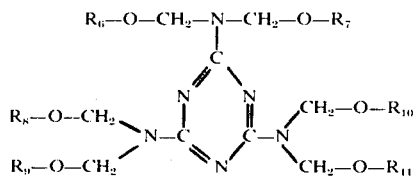

wherein the R substituents, $R_6$, $R_7$, $R_8$, $R_9$, $R_{10}$ and $R_{11}$ are either the same or different and are alkyl radicals of 1 to 4 carbon atoms.

A curable powder coating consisting essentially of polymers containing free or unreacted carboxyl, anhydride, hydroxyl, epoxy or amide functional groups such as polyesters, alkyds, polyepoxides, acrylics, polyethers, cellulosics and the like may contain up to about 35 percent by weight of said polymers, e.g. from 1.0 to 25 percent and preferably from 5 to 20 percent by weight of said polymer of at least one low molecular weight, solid phenol-modified amino-triazine as the crosslinking agent. These solid crosslinking agents may be characterized also as being non-gelled, addition products having softening points above 100°F which are obtained by reacting a monohydroxy aromatic carbon compound, e.g. at least one phenol with hexakis (alkoxymethyl) amino-triazine at temperatures ranging up to about 400°F, e.g. 100° to 400°F. Effective amounts of the powder coating, e.g. thin layers (thickness ranging up to about 10 mils) are applied to a substrate such as metal and subsequently cured at temperatures ranging from about 100°F to about 500°F and preferably at temperatures ranging from about 200°F to 400°F until a cured film is obtained. These films or coatings are formed with minimal emission of volatiles and were found to exhibit good adhesion, while having the proper combination of flexibility, hardness and gloss.

The hexaalkyl ethers of hexamethylol melamine, i.e. the hexakis (alkoxymethyl) amino-triazine may be characterized by the above-identified formula and includes specific compounds such as hexakis (methoxymethyl) amino-triazine, hexakis (ethoxymethyl) amino-triazine, hexakis (propoxymethyl) amino-triazine, hexakis (isopropoxymethyl) amino-triazine, hexakis (butoxymethyl) amino-triazine, hexakis (t-butoxymethyl) amino-triazine, hexamis (isobutoxymethyl) amino-triazine and combinations thereof in any proportion. To obtain the solid adducts, i.e. for use as crossliking agents, approximately 1.8 to 2.2 moles of the monohydroxy aromatic compound is reacted with about 1.0 mole of the aminotriazine at temperatures ranging up to about 400°F and preferably at temperatures of 100°F to 400°F, e.g. 250° to 350°F. Of the various monohydroxy aromatic compounds, the preferred compounds include phenol, ortho-, meta- or para-cresol, the xylenols, e.g. 2,3 or 3,5-xylenols, guaiacol and nitrophenol, such as p-nitrophenol, etc.

More specifically, the single-ring monohydroxy aromatic compounds may be characterized by the formula:

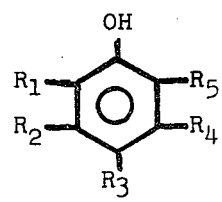

wherein the R substituents $R_1$, $R_2$, $R_3$, $R_4$ and $R_5$ are either the same or different and are selected from the class consisting of hydrogen, alkyl radicals of 1 to 4 carbon atoms such as the methyl, ethyl, propyl or butyl radicals, alkoxy radicals of 1 to 4 carbon atoms such as methoxy, ethoxy, propoxy, butoxy, a $NO_2$ radical or some other substituent preferably a non-active-hydrogen substituent; provided, however, that at least one of the R substituents is hydrogen and preferably in the ortho position, e.g. $R_1$ and $R_5$ are hydrogen.

Since it is desirable to retain in the addition product as much of the methylol ether functionality as possible and still obtain a solid product, it is essential to carry out the reaction at mole ratios of approximately 1.8 to 2.2 moles of the hydroxy compound for each mole of the amino-triazine. Although it is possible to obtain some solid addition products at higher phenol ratios, these products are poor crosslinking agents due to the slow and undesirable liberation of phenol in the curing process.

The addition products in accordance with this invention are solid, non-gelled low molecular weight products having a softening point above about 100°F. The term "non-gelled" means that the addition products can be dissolved in a suitable solvent or resin and also that the products can be melted, solidified and re-melted. The non-gelled characteristic is particularly important, if the products are to be used as crosslinking agents in polymeric powder coatings. Gellation of the products generally occurs before obtaining a solid product when using ratios of less than about 1.8 to 1.0 of phenol to triazine. Moreover, a liquid rather than a solid product (with softening point above about 100°F) is obtained if the ratio is less than 1.8 to 1.0 or more than about 2.2 to 1.0 of phenol to triazine. It is also important that at the ratios of about 1.8–2.2 to 1.0 the conversion of the monohydroxy compound exceed about 184 percent, (as illustrated in Tables I, specifically for phenol and in general for monohydroxy compounds in IA).

The data shows that in addition to the criticality of mole ratios, the completion of the reaction is also important in order to obtain products that are solid at ambient temperatures. Table I shows that for the reaction ratio of about 2.0 to 1.0 of phenol to amino-triazine, a conversion of at least about 184 percent of the phenol was obtained. The higher conversions raised the softening and melting points of the products and for all solid products (solid above 100°F) obtained at ratios of about 2:1, there was a conversion of approximately 184

TABLE I

Solid Product Range of $HM_3$-Phenol Adducts

| Examples | | Mole Ratio $HM_3$ | Phenol | Conversion** | F° Softening Point | F° Melting Point |
|---|---|---|---|---|---|---|
| 1 | | 1.0 | 0.5 | 250% | Liquid | Liquid |
| 2 | | 1.0 | 1.0 | 210%* | Liquid | Liquid |
| 3 | | 1.0 | 1.5 | 194%* | Liquid | Liquid |
| 4 | | 1.0 | 2.0 | 156% | Liquid | Liquid |
| 5 | | 1.0 | 2.0 | 184% | 102 | 119 |
| 6 | | 1.0 | 2.0 | 192% | 126 | 162 |
| 7 | (Product of Example 11) | 1.0 | 2.0 | 208%* | 223 | 242 |
| 8 | | 1.0 | 3.0 | 139%* | Liquid | Liquid |
| 9 | | 1.0 | 6.0 | 110% | 237 | 273 |

$HM_3$ is Hexakis (methoxymethyl) amino-triazine.
* Highest conversion possible due to viscosity.
** Based on functionality of 1.0 for phenol.

TABLE IA

ADDUCTS OF HYDROXYAROMATIC COMPOUNDS WITH HEXAKIS (METHOXYMETHYL) AMINO-TRIAZINE

| EXAMPLES | ADDUCT FORMER (X) | MOLE R. $HM_3/(X)$ | THEOR. (X) FUNCT. | ACTUAL (X) FUNCT. | REACTION TEMP.F° | AMB. SOLID | REACTION TIME (min.) |
|---|---|---|---|---|---|---|---|
| 36 | Phenol | 1/0.50 | 1.00 | 2.50 | 266–345 | No | 58 |
| 37 | Phenol | 1/1.00 | 1.00 | 2.10 | 246–320 | No | 90 |
| 38 | Phenol | 1/1.50 | 1.00 | 1.95 | 240–290 | No | 42 |
| 39 | Phenol | 1/2.00 | 1.00 | 2.08 | 250–330 | Yes | 80 |
| 40 | Phenol | 1/2.20 | 1.00 | 2.00 | 252–354 | Yes | 37 |
| 41 | Phenol | 1/3.00 | 1.00 | 1.39 | 256–298 | No | 75 |
| 42 | Phenol | 1/6.00 | 1.00 | 1.08 | 280–340 | Yes | 157 |
| 43 | m-Cresol | 1/1.50 | 1.00 | 2.10 | 238–390 | Yes | 28 |
| 44 | m-Cresol | 1/1.65 | 1.00 | 2.29 | 242–340 | Yes | 21 |
| 45 | m-Cresol | 1/1.75 | 1.00 | 2.31 | 250–360 | Yes | 24 |
| 46 | m-Cresol | 1/2.00 | 1.00 | 2.04 | 314–372 | Yes | 70 |
| 47 | p-Cresol | 1/1.50 | 1.00 | 1.62 | 246–404 | No | 28 |
| 48 | p-Cresol | 1/2.00 | 1.00 | 2.38 | 240–350 | Yes | 27 |
| 49 | o-Cresol | 1/2.00 | 1.00 | 1.95 | 248–326 | Yes | 35 |
| 50 | m,p-Mixed Cresols | 1/2.00 | 1.00 | 2.00 | 248–324 | Yes | 33 |
| 51 | 3,5 Dimethylphenol | 1/2.00 | 1.00 | 2.00 | 236–310 | Yes | 25 |
| 52 | 2,3 Dimethylphenol | 1/2.00 | 1.00 | 1.78 | 256–340 | Yes | 20 |
| 53 | Guaiacol | 1/2.00 | 1.00 | 2.00 | 250–238 | Yes | 20 |
| 54 | p-Nitrophenol | 1/2.00 | 1.00 | 1.90 | 266–340 | Yes | 22 |
| 55 | o-Chlorophenol | 1/2.00 | 1.00 | 2.35 | 262–318 | No | 39 |
| 56 | Pyrocatechol | 1/0.50 | 2.00 | 3.20 | 246–370 | No | 29 |
| 57 | Hydroquinone | 1/0.50 | 2.00 | 2.78 | 245–360 | No | 20 |
| 58 | Resorcinol | 1/0.50 | 2.00 | 2.66 | 240–280 | No | 20 |
| 59 | a-Naphthol | 1/0.50 | 1.00 | 2.72 | 245–360 | No | 27 |
| 60 | b-Naphthol | 1/0.50 | 1.00 | 2.70 | 246–342 | No | 20 |
| 61 | b-Naphthol | 1/0.63 | 1.00 | 2.30 | 244–328 | No | 30 |
| 62 | Pyrogallol | 1/0.33 | 3.00 | 3.30 | 232–286 | No | 20 |
| 63 | Bisphenol-A | 1/0.22 | 2.00 | 3.43 | 257–380 | No | 40 |
| 64 | Bisphenol-A | 1/0.33 | 2.00 | 4.13 | 250–360 | No | 29 |
| 65 | Bisphenol-A | 1/0.44 | 2.00 | 3.16 | 260–320 | No | 30 |
| 66 | p-Hydroxybenzoic Acid | 1/0.50 | 1.00 | 2.57 | 240–330 | No | 29 |
| 67 | p-Hydroxybenzoic Acid | 1/0.67 | 1.00 | 2.00 | 240–320 | No | 21 |
| 68 | Naphthalenediol | 1/0.50 | 2.00 | 2.50 | 226–280 | No | 15 |

NOTE:
Mole R. $HM_3/(X)$ means the mole ratio of Hexakis (methoxymethyl) amino-triazine to the hydroxyaromatic compound.

to 208 percent (or about 200 percent of the monohydroxy phenol). The percent conversion can be calculated, analytically, from the amount of alcohol generated which is based on a theoretical phenol functionality of 1.0. This assumes that the single hydroxyl group of the phenol is the only reactive group. Since the actual conversion of phenol exceeded 100 percent, however, it was found that in addition to the ether-interchange reactions, as illustrated by reaction (D), there was also a methylene-bridge formation via the aromatic ring hydrogen as illustrated by reaction (E).

ETHER INTERCHANGE REACTION (D)

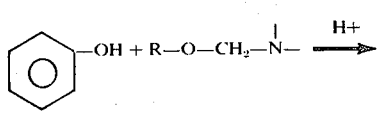

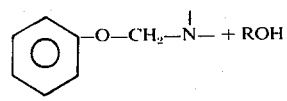

METHYLENE BRIDGE FORMATION (E)

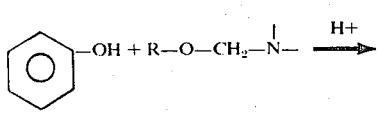

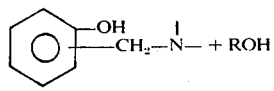

For purposes of this invention, the monohydroxy compound having one hydroxy group, theoretically, can have a 200 percent conversion assuming that all of the hydroxy group of the phenol enters into the ether-interchange reaction (illustrated by reaction D) and a methylene bridge is formed (illustrated by reaction E). The methylene bridge formation is generally directed ortho- and para- to the hydroxyl group. In a specific example of a 2:1 mole ratio of phenol to the aminotriazine at a conversion near 200 percent, the analytical results showed that the extent of the ether interchange and the methylene bridge formation were approximately equal. This was determined by nuclear magnetic resonance (NMR) and infrared spectroscopy (IR) as illustrated by Tables II and III.

TABLE II

NMR ANALYSES (EX. 7 of TABLE I)

| Structural Unit | Protons Observed at: | Approximate Relative Number of Structural Units |
| --- | --- | --- |
| $-O-\overset{a}{C}H_2-N-$ | a - 5.7 ppm | 1 |
| $-\overset{b}{C}H_2-N-$ | b - 4.9 ppm | 1 |

TABLE II-Continued

NMR ANALYSES (EX. 7 of TABLE I)

| Structural Unit | Protons Observed at: | Approximate Relative Number of Structural Units |
| --- | --- | --- |
| $-N-\overset{c}{C}H_2-O-\overset{d}{C}H_3$ | c - 5.1 ppm<br>d - 3.3 ppm | 1 |
| $-O-\overset{e}{H}$ | e - not observed | 0 |

TABLE III

IR ANALYSES (EX. 7 of TABLE I)

| Component | Frequency |
| --- | --- |
| Phenolic OH | 3360 cm$^{-1}$ |
| Aromatic Hydrogen Substitution | 750 cm$^{-1}$ |
| Triazine | 810 cm$^{-1}$ |

Determination of the absorbance ratios of OH/Triazine and aromatic/triazine peaks shows that the phenolic OH was consumed and that there was reaction of aromatic ring hydrogens.

An analysis of the distillate obtained from the reaction product of Example 11 indicates that each phenol molecule was reacted at two positions on the average as shown by data in Table IV. An analysis (Example 11) by the gel permeation chromatography (GPC) indicates that the addition product was substantially a monomeric material as shown by the data in Table V.

TABLE IV

Distillate Analyses (Ex. 11)

An analysis of the distillate obtained from the reaction of 2.0 moles of phenol with 1.0 mole HM$_3$ indicates that each phenol molecule was reacted at two positions on the average.

| Component | % of Total Distillate |
| --- | --- |
| Methanol | 77.8 |
| Formaldehyde | 6.2 |
| Water | 5.8 |
| Phenol | 10.3 |

TABLE V

Gel Permeation Chromatography (GPC)

An analysis by GPC indicates that the product was not highly polymerized.

| Area | % Total Area | Mn | Mw | D |
| --- | --- | --- | --- | --- |
| 1 | 47 | 4.4×10$^3$ | 8.5×10$^3$ | 1.9 |
| 2 | 24 | 6.7×10$^2$ | 8.1×10$^2$ | 1.2 |
| 3 | 25 | 1.5×10$^2$ | 1.7×10$^2$ | 1.1 |
| 4 | 4 | 25 | 25 | 1.1 |

From the data, it was established that etherification and methylene bridge formation are approximately equal. Reaction of the phenol had occurred in two positions, and the product was not polymeric or of a crosslinked three-dimensional network. Based on the data, the average monomeric structure for the solid adduct may be characterized by formula F.

(F)

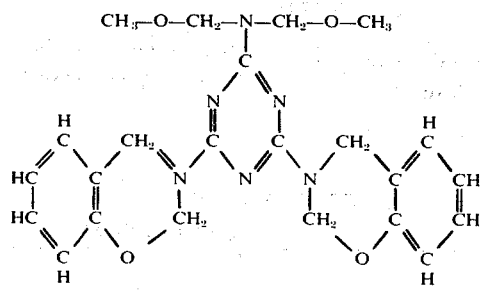

TABLE VI

Miscellaneous Analyses (Ex. 7 of Table I)

| Determination | Method | Results |
|---|---|---|
| Softening Temperature | Thermomechanical Analysis (TMA) | 74°C |
| Thermal Weight Loss | Thermal Gravimetric Analysis (TGA) | 100°C – 1.0%<br>150°C – 1.8%<br>200°C – 5.0%<br>250°C – 6.5%<br>300°C – 8.7% |
| Free Phenol Content | Gel Permeation Chromatography (GPC) | 2.5% |
| Free Phenol Content | Gas Chromatography (GC) | 2.4% |
| Crystalline Melt | Differential Thermal Analysis (DTA) | None |

Of the solid adducts prepared, the best combination of color, melting temperature, economic consideration, etc. were on the products derived from phenol and hexakis (methoxymethyl) aminotriazine. As an illustration, the addition product of Example 11 was evaluated as a crosslinking agent for polyester in the following composition.

EXAMPLE 10

| Powder Coating Reactants | Parts by Weight |
|---|---|
| Polyester Resin * | 100 |
| TiO$_2$ | 50 |
| Addition Product of Ex. 11 (Crosslinking Agent) | 25 |

* Polyester derived from dibasic acid and polyol.

The above reactants were pre-mixed and then melt mixed at approximately 200°F. The resulting plastic mass was ground to a fine powder and sieved to remove particles larger than about 100 microns. The resulting powder was found to be stable at room temperature and no clumping of the particles occurred during a two week period. The powder was subsequently applied to steel panels with an electrostatic powder spray gun using negative polarity. The steel panels were baked for 10, 20, 30 and 40 minutes to about 400°F. Although there was some yellowing of the film with the increase of exposure, the film had good flow, high gloss, no cratering and no-gassing. The latter is a property generally observed when using hexakis (methoxymethyl) melamine as the crosslinking agent. In addition, all of the coated panels achieved an acceptable cure in terms of the resistance to a solvent such as methyl isobutyl ketone.

EXAMPLE 11 (Ex. 7 in Table I)

In a suitable reaction vessel equipped with thermometer, stirrer, condenser, receiver and heating mantle, there was introduced 390 parts by weight of hexakis (methoxymethyl) amino-triazine, 188 parts by weight of phenol and 1.0 part by weight oxalic acid. The reactants were heated to approximately 240°F at which temperature distillate was removed until the temperature reached 340°F. A vacuum was applied to help remove the distillate and when a total of about 134 parts by weight of said distillate was collected, the heating and vacuum were discontinued. The hot viscous material was transferred to a suitable cooling vessel, whereupon an ambient solid with a softening point of 223°F and melting point of 242°F was obtained.

EXAMPLE 12

Into a suitable reaction vessel equipped with thermometer, stirrer, condenser, receiver, heating mantel and dropping funnel, there was introduced 565 parts by weight of phenol and 1.0 parts by weight of oxalic acid as the catalyst. The reactants were heated to 280°F at which point approximately 390 parts by weight of hexakis (methoxymethyl) amino-triazine were added by dropping funnel until the temperature reached about 340°F. The reaction was maintained until approximately 192 parts by weight of distillate were obtained. A moderately viscous product was subsequently transferred to a suitable cooling vessel, whereupon an ambient solid having a softening point of 237°F and a melting point of 273°F was obtained.

EXAMPLE 13

Following the procedure set forth in Example 11, the following reactants were added to the reactor.

| Reactants | Parts by Weight |
|---|---|
| Hexakis (methoxymethyl) amino-triazine | 390 |
| m-Cresol | 260 |
| Oxalic Acid | 1.0 |

After removing approximately 140 parts of distillate at temperatures of 240° to 372°F, an ambient solid product was obtained upon cooling; said product had a softening point of 226°F and a melting point of 255°F.

EXAMPLE 14

An addition product was prepared in accordance with the procedure set forth in Example 11 with the following reactants.

| Reactants | Parts by Weight |
|---|---|
| Hexakis (methoxymethyl) amino-triazine | 390 |
| p-Cresol | 260 |
| Oxalic Acid | 1.0 |

After the removal of about 153 parts by weight of distillate at temperatures of about 240° to 350°F an ambient solid product was obtained upon cooling; said product had a softening point of 203°F and a melting point of 232°F.

EXAMPLE 15

A solid addition product was obtained in accordance with the procedure set forth in Example 11 by reacting the following.

| Reactants | Parts by Weight |
|---|---|
| Hexakis (methoxymethyl) amino-triazine | 390 |
| Ortho-Cresol | 260 |
| Oxalic Acid | 1.0 |

After removing approximately 125 parts by weight of distillate at 252° to 326°F, an ambient solid product was obtained upon cooling; said product had a softening point of 151°F and a melting point of 165°F.

EXAMPLE 16

A solid addition product was obtained by following the procedure of Example 11 by reacting the following.

| Reactants | Parts by Weight |
|---|---|
| Hexakis (methoxymethyl) amino-triazine | 390 |
| Mixture of m-Cresol and p-Cresol | 260 |
| Oxalic Acid | 1.0 |

After removing approximately 128 parts by weight of distillate at temperatures ranging from 248° to 324°F, an ambient solid product was obtained upon cooling.

EXAMPLE 17

A solid addition product was obtained by reacting the following reactants in accordance with the procedure of Example 11.

| Reactants | Parts by Weight |
|---|---|
| Hexakis (methoxymethyl) amino-triazine | 390 |
| 2,3-dimethylphenol | 245 |
| Oxalic Acid | 1.0 |

After removing 114 parts by weight of distillate at temperatures of about 240° to 340°F, an ambient solid product was obtained upon cooling; said product had a softening point of 221°F and a melting point of 237°F.

EXAMPLE 18

A solid addition product was obtained by reacting the following in accordance with the procedure of Example 11.

| Reactants | Parts by Weight |
|---|---|
| Hexakis (methoxymethyl) amino-triazine | 390 |
| 3,5-dimethylphenol | 245 |
| Oxalic Acid | 1.0 |

After the removal of about 125 parts by weight of distillate at temperatures of 236° to 310°F, an ambient solid product was obtained upon cooling; said product had a softening point of 255°F and a melting point of 277°F.

EXAMPLE 19

A solid addition product was prepared in accordance with the procedure of Example 11 from the following reactants.

| Reactants | Parts by Weight |
|---|---|
| Hexakis (methoxymethyl) amino-triazine | 390 |
| Guaiacol | 248 |
| Oxalic Acid | 3.0 |

After removing approximately 128 parts by weight of distillate at temperatures ranging from 250° to 358°F, upon cooling an ambient solid product was obtained which had a softening point of 158°F and a melting point of 187°F.

EXAMPLE 20

A solid addition product was obtained in accordance with the procedure set forth in Example 11 from the following reactants.

| Reactants | Parts by Weight |
|---|---|
| Hexakis (methoxymethyl) amino-triazine | 390 |
| p-Nitrophenol | 278.2 |
| Oxalic Acid | 2.0 |

After removing approximately 122 parts of distillate at temperatures ranging from 266° to 304°F, upon cooling, an ambient solid product was obtained which had a softening point of 230°F and a melting point of 284°F.

EXAMPLE 21

A highly butoxymethylated amino-triazine was prepared by transetherification of hexakis (methoxymethyl) amino-triazine with an excess of butanol as follows.

| Reactants | Parts by Weight |
|---|---|
| Hexakis (methoxymethyl) amino-triazine | 858 |
| Butanol | 978 |
| Oxalic Acid | 15 |

The reactants were added to a three-liter reactor equipped with a thermometer, stirrer, condenser and receiver. The reactants were heated to 212°F at which temperature distillation occurred. As the distillate was removed, additional butanol was added by dropping funnel until a temperature of 265°F was obtained. A vacuum was applied and the excess butanol was stripped from the reactor. Chemical analysis identified the product as pentabutoxymethoxymethyl aminotriazine.

EXAMPLE 22

A solid addition product was prepared in accordance with the procedure of Example 11 from the following reactants:

| Reactants | Parts by Weight |
| --- | --- |
| Penta(butoxy)methoxymethyl amino-triazine(Product of Ex. 21) | 642 |
| Phenol | 94.1 |
| Oxalic Acid | 2.0 |

After removing approximately 291 parts by weight of distillate at temperatures ranging from 302° to 390°F, and upon cooling, an ambient solid product was obtained which had a softening point of 122°F and a melting point of 149°F.

EXAMPLE 23

In a reaction vessel equipped with thermometer, stirrer, condenser and receiver there was introduced 390 parts by weight of hexakis (methoxymethyl) amino-triazine and 1.0 parts by weight of oxalic acid. The reactants were heated to 300°F at which temperature melted phenol was added to the reactor with a dropping funnel. Approximately 188 parts by weight of the phenol was added over a period of about 2 hours at a temperature of about 300°F. A vacuum was applied until about 128 parts by weight of distillate was removed from the reactor. Upon cooling, a solid product was obtained which had a softening point of 104°F and a melting point of 140°F.

EXAMPLES 24–27

Four different non-solid resinous products were obtained by following the procedure set forth in Example 11 utilizing (1) o-chorophenol, (2) alpha-naphthol, (3) beta-naphthol and (4) p-hydroxy benzoic acid as the monohydroxy aromatic compounds. With the exception of chlorophenol where a 2 to 1 mole ratio was used, each of the hydroxyaromatic compounds were reacted with hexakis (methoxymethyl) amino-triazine in a 1 to 2 mole ratio at temperatures ranging from about 240° to 360°F. Methanol distillate was removed until no further reaction took place or until an extremely viscous fluid was obtained. The reaction products were characterized, upon cooling, as non-solid resinous products.

EXAMPLES 28–32

Five different non-solid addition products of hexakis (methoxymethyl) amino-triazine were obtained following the procedure set forth in Example 11, wherein the dihydroxyaromatic compounds were (1) pyrocatechol, (2) hydroquinone, (3) resorcinol, (4) Bisphenol-A and (5) naphthalene diol. Each of these dihydroxyaromatic compounds were reacted with hexakis (methoxymethyl) amino-triazine in a 1 to 2 mole ratio at temperatures ranging from about 240° to 360°F. Methanol distillate was removed from the reactor until no further condensation took place or until extremely viscous products were obtained. Upon cooling, non-solid resinous products were obtained.

EXAMPLE 33

Following the procedure set forth in Example 11, a non-solid adduct was obtained by reacting approximately 42 parts by weight of trihydroxybenzene with 390 parts by weight of hexakis (methoxymethyl) amino-triazine in the presence of 1.0 parts by weight of oxalic acid at temperatures of about 232°F. Approximately 35 parts by weight of distillate were removed from the reactor while the temperature reached 286°F. Upon cooling, a very viscous, nonsolid product was obtained.

As shown by Example 24 through 33, non-solid products were obtained when using hydroxyaromatic compounds which either had more than one hydroxy group per molecule, more than a single aromatic ring or both. To obtain solid addition products capable of being used as a crosslinking agent in powder coatings, it is essential to react single-ring aromatic monohydroxy compounds with the hexakis (alkoxymethyl) amino-triazine.

EXAMPLE 34

The reaction product of hexakis (methoxymethyl) amino-triazine and Bisphenol-A at a ratio of 1:2 was obtained by following the procedure set forth in Example 11.

| Reactants | Parts by Weight |
| --- | --- |
| Hexakis (methoxymethyl) amino-triazine | 292.5 (0.75 mole) |
| Bisphenol-A | 342 (1.5 mole) |
| Oxalic Acid | 0.75 |

The reaction was continued to the gel point and approximately 51 parts by weight (1.59 moles) of methanol were distilled at temperatures ranging from 250° to 330°F under a vacuum. Approximately 1.0 mole of methanol was obtained per mole of Bisphenol which indicates that each Bisphenol molecule was reacted on the average in only one position and that the "ring bridge" did not occur. Only single ether bridges or single methylene bridges were formed between aminotriazine and the Bisphenol.

EXAMPLE 35

An addition product was obtained by following the procedure of Example 11 by reacting hexakis (methoxymethyl) amino-triazine with Bisphenol in the ratio of 2:1.

| Reactants | Parts by Weight |
| --- | --- |
| Hexakis (methoxymethyl) amino-triazine | 507 (1.3 moles) |
| Bisphenol-A | 148.2 (0.65 moles) |
| Oxalic Acid | 0.65 |

This reaction was carried to the gel point of the product. Approximately 58 parts by weight (1.8 moles) of methanol were distilled at temperatures ranging from 250° to 330°F under a vacuum. Approximately 1.0 mole of methanol was distilled from the reaction for each mole of amino-triazine indicating a single-linkage (no ring bridge) between the Bisphenol and the aminotriazine. Bisphenol is p,p'-isopropylidenediphenol.

As indicated, the addition product of this invention is particularly useful as the crosslinking agent for a wide variety of polymers including, for example, polymeric materials containing unreacted or free carboxyl groups, anhydride groups, hydroxyl, amide or epoxy groups and are particularly useful as crosslinking agents for a variety of polymers, e.g. polyesters, alkyd resins, polyepoxides, functionally reactive acrylic and vinyl polymers and the cellulosics such as nitrocellulose, ethylcellulose, carboxylated cellulose, hydroxycellulose and derivatives thereof. For example, the polyesters which may be crosslinked with the solid addition products of this invention are derived from various carboxylic acids and polyhydroxy alcohols including phthalic acid, tetephthalic acid, isophthalic acid and halogen-substituted derivatives of these acids such as hexachlorophthalic acid. These acids may be used either alone or in combination and in some instances, small but effective amounts of an aliphatic carboxylic acid, e.g. adipic acid, etc. and esterified with one or more polyols. The polyols include, 2,2-di(4-betahydroxyethoxyphenyl) propane, 2,2-di(4-betahydroxyethoxyphenyl) butane, 2,2-di(3-methyl-4-betahydroxyethoxyphenyl) propane and various other dihydric aliphatic alcohols such as propylene glycol, ethylene glycol, etc.

As shown by the specific examples, the solid addition products are generally prepared by charging to a suitable reaction vessel at least one hexakis (alkoxymethyl) amino-triazine and at least one hydroxy aromatic compound with a catalytic amount of an acid. The reactants are heated with stirring to temperatures ranging up to about 400°F where condensation takes place and alchol is liberated. The alcohol is distilled and condensed into a Barrett trap under a vacuum, if necessary. The distilled alcohol is used as a means of monitoring the completion of the reaction. Generally, the end-point or completion is reached when either a predetermined or calculated amount of distillate, e.g. alcohol has been removed from the reactor or in the alternatives when the product becomes excessively viscous or when no additional distillate is obtained. Although oxalic acid is specifically disclosed as the catalyst, it is obvious that other acids including both the inorganic and organic acids may be used in catalytic amounts. Various acids including, for example, the mineral acids, e.g. sulfuric acid, hydrochloric acid, nitric acid and some of the organic acids, e.g. sulfonic acid, e.g. toluene sulfonic acid, phthalic acid, acetic acid, etc. either alone or in combination and may be used in amounts ranging from about 0.01 to 5.0 percent and preferably ranging up to 3.0 percent, e.g. from about 0.1 to 3.0 percent by weight of the reactants.

In preparing a powder coating, for example, various polymers, e.g. an alkyd resin and effective amounts of the solid crosslinking agent are mixed and subsequently crushed or ground in a suitable device to obtained a free-flowing powder having an average particle size ranging up to about 200 microns, e.g. 10 to 100 microns. The polymeric powder may be applied by conventional techniques, e.g. fluidized bed or electrostatic spraying onto various substrates such as metal, plastic, wood, etc. and subsequently baked at temperatures ranging up to about 500°F to obtain a cured film having thicknesses ranging up to about 12 mils or higher, e.g. from about 3–8 mils.

The polymeric powder coatings may contain up to 60 percent by weight of the polymers of various pigments including titanium dioxide, silica, chromates, carbon black, talc, etc. In addition, color pigment may be used such as cadmium red, cadmium yellow, phthalocyanine dyes, chrome green, toluidene red, iron oxide and the like. Other additives that may be added to the coating composition include flow agents, fungicides, antioxidants and the like.

While this invention has been described by a number of specific embodiments, it is obvious that other variations and modifications may be made without departing from the spirit and scope of the invention as set forth in the appended claims.

What is claimed is:

1. A non-gelled, low molecular weight solid addition product having a softening point above 100°F obtained by reacting
   a. approximately 1.8 to 2.2 moles of at least one monohydroxy aromatic compound having the formula:

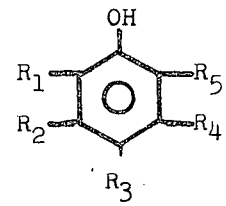

wherein the R substituents $R_1$, $R_2$, $R_3$, $R_4$ and $R_5$ are either the same or different and are selected from the class consisting of hydrogen, alkyl radicals of 1 to 4 carbon atoms, alkoxy radicals of 1 to 4 carbon atoms and $NO_2$ radicals provided that at least one of the R substituents is hydrogen and
   b. approximately 1.0 mole of an alkoxymethyl amino-triazine having the formula:

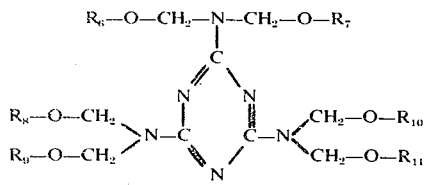

wherein the R substituents, $R_6$, $R_7$, $R_8$, $R_9$, $R_{10}$ and $R_{11}$ are either the same or different and are alkyl radicals of 1 to 4 carbon atoms.

2. The non-gelled, low molecular weight, solid addition product of claim 1 further characterized in that the monohydroxy amino-triazine compound is a substituted phenol and the amono-triazine is characterized by the formula wherein at least one of the R substituents is a methyl radical.

3. The non-gelled, low molecular weight solid addition product of claim 1 further characterized in that the monohydroxy aromatic compound is para-nitrophenol.

4. The non-gelled, low molecular weight solid addition product of claim 1 further characterized in that the monohydroxy aromatic compound is phenol.

5. The non-gelled, low molecular weight solid addition product of claim 1 further characterized in that the monohydroxy aromatic compound is an ortho-, meta- or para-cresol.

6. The non-gelled, low molecular weight solid addition product of claim 1 further characterized in that the monohydroxy aromatic compound is xylenol.

7. The non-gelled, low molecular weight solid addition product of claim 1 further characterized in that $R_1$, $R_2$, $R_3$ and $R_4$ are hydrogen and $R_5$ is an alkoxy radical of 1 to 4 carbon atoms.

8. The non-gelled, low molecular weight solid addition product of claim 1 further characterized in that the monohydroxy aromatic compound is guaiacol.

9. The non-gelled, low molecular weight solid addition product of claim 1 further characterized in that the amino-triazine has the formula wherein at least one of the R substituents is a butyl radical.

10. The non-gelled, low molecular weight solid addition product of claim 1 further characterized in that the monohydroxy aromatic compound is phenol and the amino-triazine is hexakis (methoxymethyl) amino-triazine.

11. The non-gelled, low molecular weight solid addition product of claim 1 further characterized in that the monohydroxy aromatic compound is an alkyl-substituted phenol and the amino-triazine is hexakis (methoxymethyl) amino-triazine.

12. The non-gelled, low molecular weight solid addition product of claim 1 further characterized in that the monohydroxy aromatic compound is an alkoxy-substituted phenol and the amino-triazine is penta(isobutoxy)methoxymethyl amino-triazine.

* * * * *